United States Patent
Spence et al.

(10) Patent No.: US 9,604,737 B2
(45) Date of Patent: *Mar. 28, 2017

(54) DIRECTIONALLY CONTROLLED ELASTICALLY DEPLOYABLE ROLL-OUT SOLAR ARRAY

(71) Applicant: Deployable Space Systems, Inc., Goleta, CA (US)

(72) Inventors: Brian R Spence, Solvang, CA (US); Stephen F White, Ventura, CA (US)

(73) Assignee: Deployable Space Systems, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/173,252

(22) Filed: Feb. 5, 2014

(65) Prior Publication Data

US 2014/0150863 A1 Jun. 5, 2014

Related U.S. Application Data

(63) Continuation of application No. 13/010,739, filed on Jan. 20, 2011, now Pat. No. 8,683,755.
(Continued)

(51) Int. Cl.
*B64G 1/22* (2006.01)
*H02S 30/20* (2014.01)
(Continued)

(52) U.S. Cl.
CPC ............. *B64G 1/443* (2013.01); *B64G 1/222* (2013.01); *Y10T 428/1362* (2015.01)

(58) Field of Classification Search
CPC ......... B64G 1/443; B64G 1/222; H02S 20/00; H02S 30/20; Y10T 428/1362; Y02E 10/50
(Continued)

(56) References Cited

U.S. PATENT DOCUMENTS 3,145,948 A * 8/1964 Kershner ...................... 244/168
3,473,758 A 10/1969 Valentijn
(Continued)

OTHER PUBLICATIONS

Brian R. Spence & Lee F. Sword, Mars Pathfinder Rover Egress Deployable Ramp System, May 1996, 30th Aerospace Mechanisms Symposium, NASA Langley Research Center, VA, US.

*Primary Examiner* — Rodney Mintz
(74) *Attorney, Agent, or Firm* — R. Scott Kimsey, Esq.; Klein DeNatale Goldner

(57) ABSTRACT

A directionally-controlled roll-out elastically deployable solar array structure is disclosed. The structure includes one or more longitudinal elastic roll out booms that may be closed section or open section to allow for efficient rolled packaging onto a lateral mandrel. A flexible photovoltaic blanket is attached to a tip structure and to a lateral base support structure, but remains uncoupled from the longitudinal booms. The solar array system may be stowed simultaneously into a rolled package comprised of the roll out booms and the flexible planar blanket together, or onto independent rolls. Alternatively, the system may be stowed by rolling the booms, and accordion Z-folding the hinged flexible photovoltaic blanket into a flat stack. Structural deployment is motivated by the elastic strain energy of the roll out booms, and several methods of deployment direction control are provided to ensure a known, controlled, and unidirectional deployment path of the elastically unrolling booms.

18 Claims, 14 Drawing Sheets

Related U.S. Application Data

(60) Provisional application No. 61/297,079, filed on Jan. 21, 2010.

(51) Int. Cl.

| | | |
|---|---|---|
| *B64G 1/44* | (2006.01) | |
| *E04H 12/18* | (2006.01) | |
| *H01L 31/042* | (2014.01) | |
| *H01L 31/045* | (2006.01) | |

(58) Field of Classification Search
USPC ............ 52/108, 111, 114, 121, 173.1, 173.3; 136/245, 292; 244/172.6, 172.7
See application file for complete search history.

(56) References Cited

U.S. PATENT DOCUMENTS

| | | | | |
|---|---|---|---|---|
| 3,490,950 | A * | 1/1970 | Myer | 136/246 |
| 3,690,080 | A | 9/1972 | Dillard | |
| 3,733,758 | A | 5/1973 | Maier et al. | |
| 4,587,777 | A | 5/1986 | Brown et al. | |
| 4,635,071 | A * | 1/1987 | Gounder et al. | 343/897 |
| 4,636,579 | A | 1/1987 | Hanak | |
| 4,713,492 | A | 12/1987 | Hanak | |
| 4,727,932 | A | 3/1988 | Mahefkey | |
| 5,131,955 | A | 7/1992 | Stern et al. | |
| 5,296,044 | A | 3/1994 | Harvey et al. | |
| 5,487,791 | A | 1/1996 | Everman | |
| 5,567,500 | A * | 10/1996 | Marshall et al. | 428/116 |
| 5,647,916 | A | 7/1997 | Guazzoni | |
| 5,789,060 | A * | 8/1998 | Marshall et al. | 428/116 |
| 5,865,905 | A | 2/1999 | Clemens | |
| 5,885,367 | A | 3/1999 | Brown et al. | |
| 6,008,447 | A | 12/1999 | Meurer et al. | |
| 6,310,281 | B1 | 10/2001 | Wendt | |
| 6,505,795 | B1 * | 1/2003 | Thompson et al. | 244/172.6 |
| 6,547,190 | B1 * | 4/2003 | Thompson et al. | 244/172.7 |
| 6,637,702 | B1 | 10/2003 | McCandless | |
| 6,702,976 | B2 * | 3/2004 | Sokolowski | 264/321 |
| 6,772,479 | B2 * | 8/2004 | Hinkley et al. | 16/225 |
| 6,904,722 | B2 | 6/2005 | Brown et al. | |
| 6,920,722 | B2 | 7/2005 | Brown et al. | |
| 6,983,914 | B2 * | 1/2006 | Stribling | B64G 1/222 |
| | | | | 136/292 |
| 7,211,722 | B1 | 5/2007 | Murphy | |
| 7,708,228 | B2 | 5/2010 | Chaix et al. | |
| 7,710,348 | B2 | 5/2010 | Taylor | |
| 7,806,370 | B2 | 10/2010 | Beidleman et al. | |
| 7,895,795 | B1 * | 3/2011 | Murphey et al. | 52/108 |
| 8,061,660 | B2 | 11/2011 | Beidleman et al. | |
| 8,066,227 | B2 | 11/2011 | Keller et al. | |
| 8,109,472 | B1 | 2/2012 | Keller et al. | |
| 8,376,282 | B2 | 2/2013 | Keller et al. | |
| 8,387,921 | B2 | 3/2013 | Taylor et al. | |
| 8,393,581 | B2 | 3/2013 | Keller et al. | |
| 8,616,502 | B1 * | 12/2013 | Stribling et al. | 244/172.7 |
| 8,636,253 | B1 * | 1/2014 | Spence et al. | 244/172.8 |
| 8,683,755 | B1 * | 4/2014 | Spence et al. | 52/108 |
| 8,757,553 | B2 * | 6/2014 | Legrand et al. | 244/159.5 |
| 8,770,522 | B1 | 7/2014 | Murphey et al. | 244/172.6 |
| 8,893,442 | B1 * | 11/2014 | Spence et al. | 52/108 |
| 8,894,017 | B1 * | 11/2014 | Baghdasarian | 244/172.7 |
| 8,915,474 | B1 * | 12/2014 | Baghdasarian et al. | 244/172.6 |
| 9,004,410 | B1 * | 4/2015 | Steele et al. | 244/172.7 |
| 9,079,673 | B1 * | 7/2015 | Steele | B64G 1/443 |
| | | | | 244/172.7 |
| 9,120,583 | B1 * | 9/2015 | Spence | B64G 1/222 |
| | | | | 244/172.8 |
| 9,156,568 | B1 * | 10/2015 | Spence | B64G 1/42 |
| | | | | 244/172.7 |
| 2002/0040726 | A1 | 4/2002 | Roth et al. | |
| 2002/0112417 | A1 | 8/2002 | Brown et al. | |
| 2003/0000569 | A1 | 1/2003 | Zwanenburg | |
| 2003/0057329 | A1 * | 3/2003 | Thompson et al. | 244/173 |
| 2003/0164186 | A1 | 9/2003 | Clark | |
| 2004/0016454 | A1 | 1/2004 | Murphy et al. | |
| 2004/0194397 | A1 | 10/2004 | Brown et al. | |
| 2005/0178921 | A1 | 8/2005 | Stribling et al. | |
| 2006/0174930 | A1 | 8/2006 | Murphy et al. | |
| 2007/0017566 | A1 | 1/2007 | Gaudiana et al. | |
| 2007/0262204 | A1 | 11/2007 | Beidleman et al. | |
| 2009/0078306 | A1 * | 3/2009 | Nagengast et al. | 136/251 |
| 2009/0126775 | A1 | 5/2009 | White et al. | 136/245 |
| 2009/0184207 | A1 * | 7/2009 | Warren et al. | 244/172.6 |
| 2011/0162690 | A1 | 7/2011 | Workman et al. | |
| 2011/0192444 | A1 | 8/2011 | Beidleman et al. | |
| 2011/0204186 | A1 | 8/2011 | Keller et al. | |
| 2011/0210209 | A1 | 9/2011 | Taylor | |
| 2011/0253614 | A1 | 10/2011 | Curran et al. | |
| 2012/0012154 | A1 | 1/2012 | Keller | |
| 2012/0025750 | A1 | 2/2012 | Margo | |
| 2012/0090660 | A1 | 4/2012 | Keller et al. | |
| 2012/0167943 | A1 | 7/2012 | Blanchard et al. | |
| 2012/0167944 | A1 | 7/2012 | Blanchard et al. | |
| 2013/0061541 | A1 | 3/2013 | Taylor et al. | |
| 2013/0186011 | A1 | 7/2013 | Keller et al. | |
| 2014/0042275 | A1 * | 2/2014 | Abrams et al. | 244/172.6 |
| 2014/0123575 | A1 * | 5/2014 | Bobbio | 52/108 |
| 2014/0151485 | A1 | 6/2014 | Baudasse et al. | 242/375 |
| 2014/0230949 | A1 * | 8/2014 | Daton-Lovett | 138/177 |
| 2014/0326833 | A1 * | 11/2014 | Spence et al. | 244/172.7 |
| 2015/0311365 | A1 * | 10/2015 | Frolov | H01L 31/0392 |
| | | | | 136/251 |
| 2015/0368903 | A1 * | 12/2015 | Turse | E04C 3/005 |
| | | | | 242/407 |

* cited by examiner

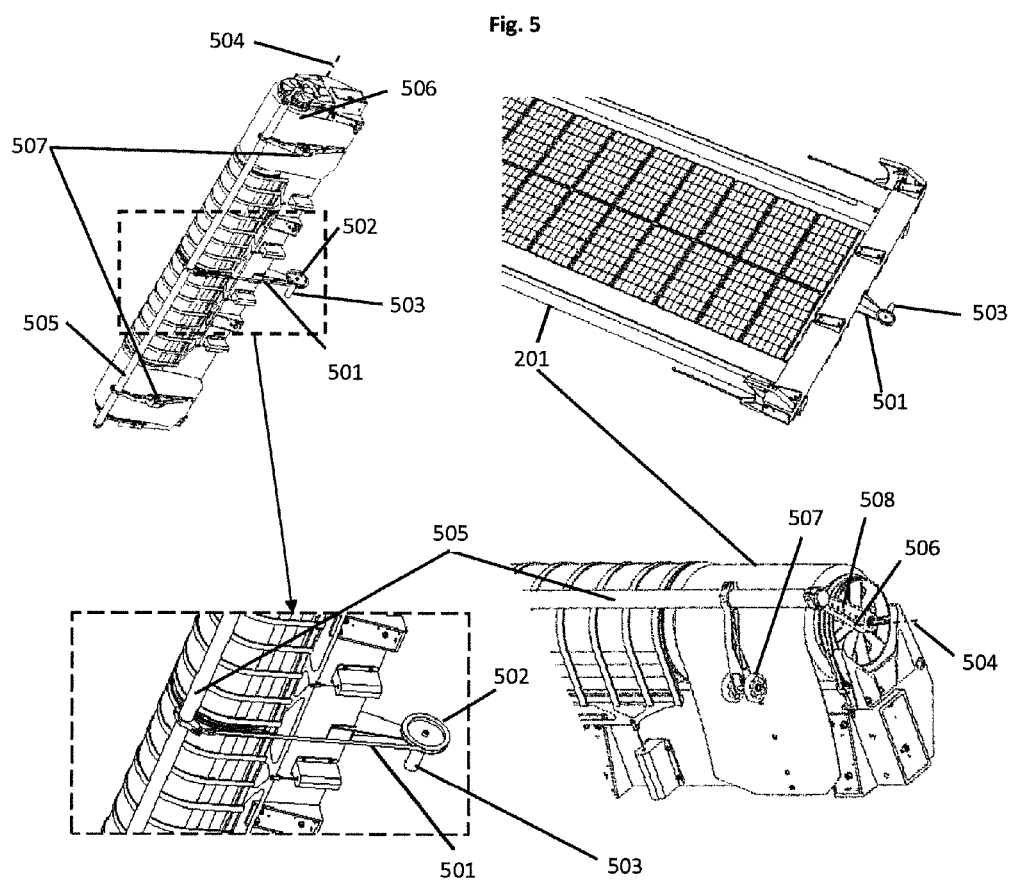

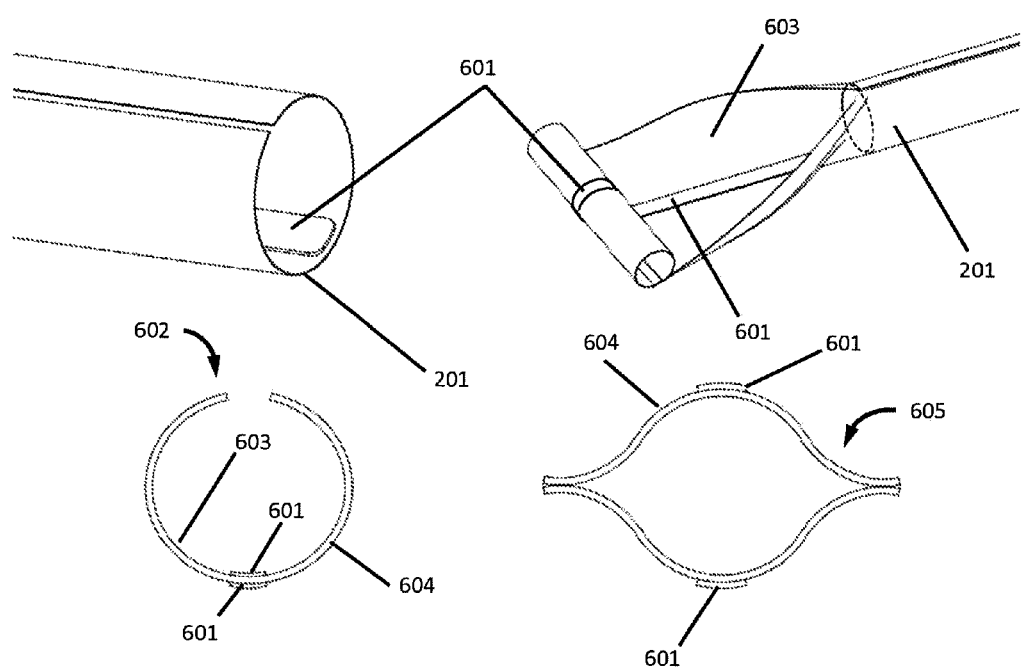

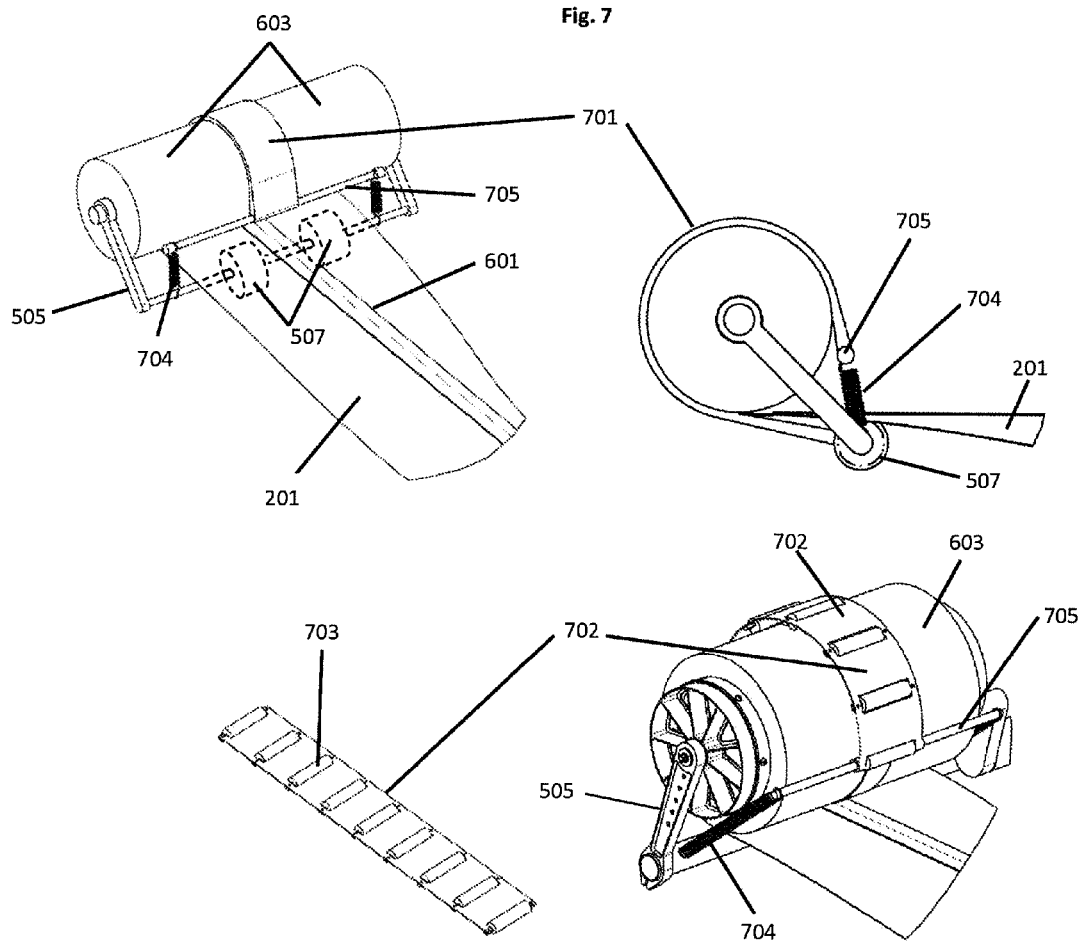

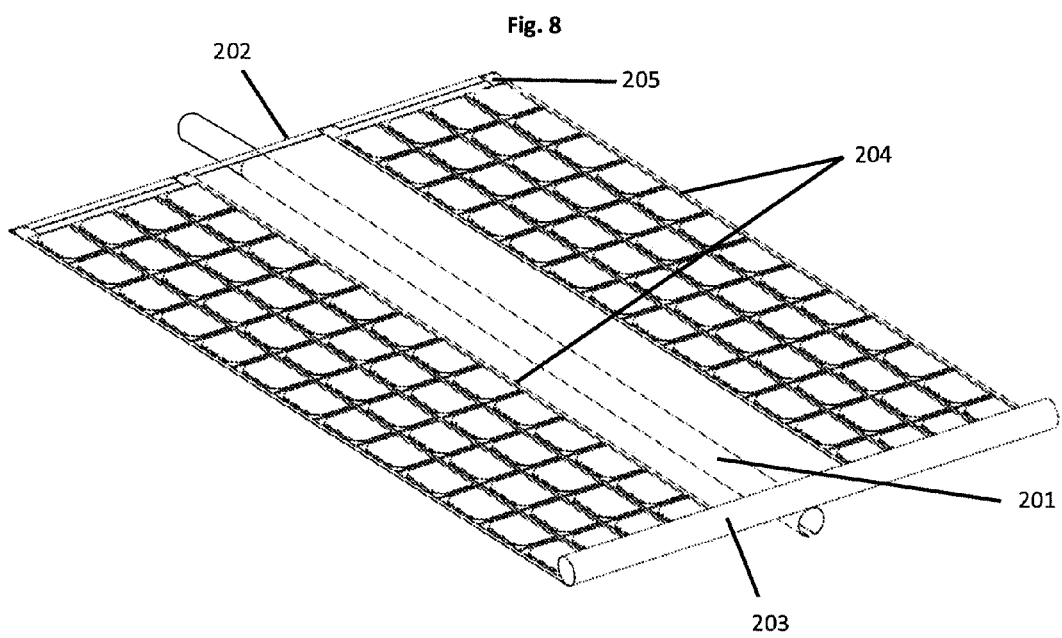

Fig. 15
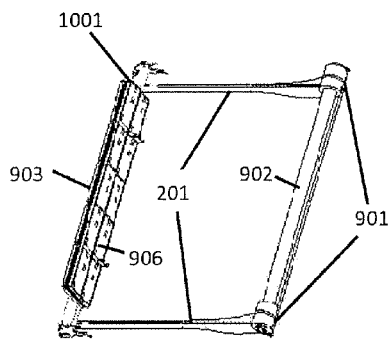
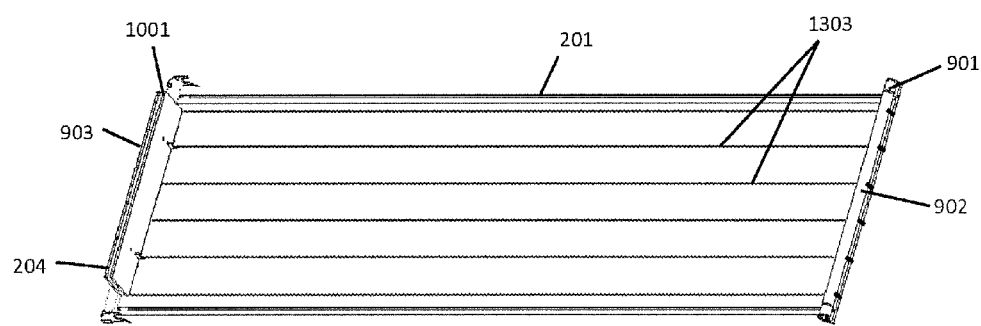
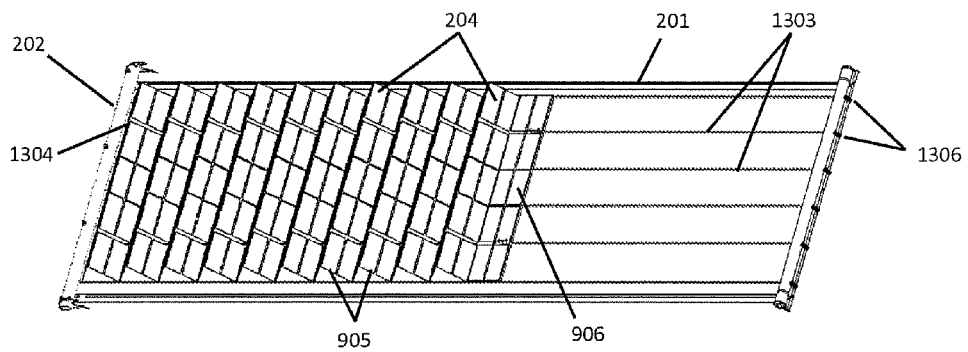

DIRECTIONALLY CONTROLLED ELASTICALLY DEPLOYABLE ROLL-OUT SOLAR ARRAY

CROSS-REFERENCE TO RELATED APPLICATIONS

This is a continuation application of U.S. patent application Ser. No. 13/010,739 which was filed on Jan. 20, 2011 for which application these inventors claim domestic priority.

This invention relates to the field of solar arrays for space-based applications and, in particular, to flexible-blanket solar arrays deployable from a spacecraft that are stowable in a small volume for shipment and launch. The U.S. Government may have rights in this invention pursuant to Contract. No. FA9453-08-M-0094.

FIELD OF THE INVENTION

Background

A solar array, as defined herein, pertains to a structure which is stowable in a small volume for shipment and launch, and that is deployable when in space to expose a large surface area of photovoltaic collectors (solar cells) to the sun, and that is attached to certain spacecraft vehicles, to provide power for spacecraft operations. FIG. 1 shows a typical spacecraft (101) that uses a solar array (102) for power production, with the solar array (102) in the deployed configuration.

Solar arrays typically consist of an underlying structure for deployment of a substantial number of individual photovoltaic solar cells from the body of a spacecraft. Once fully deployed, it is desirable for the solar array structure to provide a lightweight, stiff, strong, stable and flat platform for the solar cells to allow uniform exposure to the sun and minimize on-orbit spacecraft attitude control disturbance loads. Solar arrays are typically stowed such that they are constrained in a small envelope prior to and during launch of the spacecraft and then are deployed to their fully extended configuration, exposing the maximum area of solar cells once the spacecraft has reached its position in outer space. It is desirable to minimize the volume of the stowed package while at the same time maximizing the available solar cell area that can be packaged when stowed, and subsequently deployed to allow for maximum power production for the spacecraft.

In certain prior art applications of solar arrays, the structure consists of flat rigid panel substrates that are configured for stowage by means such as hinges which will permit the panels to be folded against each other to minimize the dimensions of the array in the stowed configuration. Folding of rigid panels involves mechanical items such as hinges and latches; and actuating mechanisms such as springs, cables and pulleys which must be highly reliable to prevent complete loss of a spacecraft and its payload due to inability to deploy the power-producing array. These mechanical components are costly, and involve added weight which is desirable to minimize. An example of such an array is shown in: Everman et al U.S. Pat. No. 5,487,791.

In order to allow for further reduction in the deployable solar arrays weight and stowed volume, the solar cell mounting can be configured using a flexible substrate, or blanket. Various flexible solar cell blanket substrates have been used, such as those fabricated from a fiberglass mesh or thin polymeric sheet upon which are bonded the numerous crystalline solar cells. Flexible-blanket solar arrays have been typically been limited to crystalline solar cell arrays packaged in a long roll or pleated stack that is deployed using a separate deployment boom or hub structure requiring external motor power for deployment motive force. These flexible array deployment structures have typically consisted of very complex mechanical systems such as coilable or articulated truss booms, or radially oriented spars that rotate about a central hub, which can add undesired parts, complexity, weight and cost to implement. Examples of prior art flexible blanket arrays are shown in the following United States patents: Harvey et al U.S. Pat. No. 5,296,044; Stribling et al U.S. Pat. No. 6,983,914; Hanak et al U.S. Pat. No. 4,636,579 and Beidleman et al U.S. Pat. No. 7,806,370.

Critical to ensuring deployment reliability is to allow for maximum deployment motive force (or torque) in the design of the deployment actuators. Reliability is enhanced when the deployment actuation has a large force margin (typically required to be at least 3:1) over any and all predicted (and unforeseen) sources of resistance to deployment, such as harness bending, friction in joints, snagging or adhesive sticking between blanket layers. Historical solutions used to increase deployment force margin in a linearly deploying boom have been to increase the size and capability of structural components and use deployment actuators (such as springs or motors) to "force" the boom out, further increasing weight and complexity. An example of this sort of prior art is the bi-stem booms used on the Hubble telescope solar array to unfurl the solar blankets. In this application, the booms are comprised of paired curled sheets of metal that are rolled and nest within one other to form a cylindrical boom upon deployment, and a complex and heavy motorized mechanism is used to externally push the boom material out in a known deployment direction and with sufficient force. Utilizing the elastic strain energy inherent in the deployment boom material alone to achieve high deployment force has not been successfully used in the prior art for deployable boom-type solar array structures. This is because in order to raise the available actuation energy to levels sufficient to achieve acceptable deployment force margin, typical metallic or fiber-composite materials are too highly stressed (they are unacceptably close to failure), and the kinematics of deployment are difficult to control and predict due to the high internal energy and ungoverned nature of the stowed assembly upon release.

It is also desirable to maximize the deployed natural frequency (stiffness) and strength (against deployed accelerations) of a solar array. As the size of the solar cell deployed area and the solar array supporting structure increase, the stiffness of the solar cell array decreases and, as a result, the vibration frequency decreases and disturbance deflections increase. The ability of the spacecraft attitude control system to orient the spacecraft may be impaired if the deflections due to low-frequency solar array movement are excessive.

A review of the prior art shows that significant efforts have been made to reduce the weight and increase the deployment reliability and force margins of rigid and flexible blanket solar arrays for a given set of deployed stiffness and strength requirements. These prior efforts have resulted in solar array designs tending to involve difficult and time consuming manufacturing, higher complexity and higher cost.

The current larger market for spacecraft is demanding significant decreases in the cost of all spacecraft systems and payloads, including solar arrays. As the demand for spacecraft power grows, it is desirable to provide a deployable solar array system that permits straightforward scaling up in size to allow use of larger deployed solar cell areas. It is also desirable to enhance reliability, while at the same time reducing weight and cost, by reducing the number of component parts and mechanisms required to achieve deployment and adequate deployed performance. Because mechanical components are subject to failure, and must be rigorously tested as an assembled system to validate their reliability; solar array reliability can be increased significantly, while simultaneously reducing cost and mass, by reducing the amount of mechanical components and mechanisms required to deploy and form the array into a deployed structure.

SUMMARY

The solar array of this invention has been greatly simplified relative to the state of the art by significantly reducing the complexity and number of mechanical parts required for deployment of the solar cell-populated flexible blanket. The invention replaces complex deployable mechanisms with a simple ultra-lightweight one-part tubular rolled boom structural element, that reliably elastically self-deploys under its own strain energy and is directionally controlled such that it deploys in a known, unidirectional manner without the need for heavy and complex auxiliary actuators to assist deployment or add deploy force. The boom structural element requires no hinges, dampers, complicated synchronization mechanisms, brakes, or motors for deployment, and does not have the parasitic mass associated with the mechanisms typically required by other prior art deployable solar array structures to achieve high deployment force margin. Because the boom structure self-deploys elastically via its own high internal strain energy, it does not require passive (solar) or active (via powered heaters) heating of the boom material to actuate deployment, and provides its own internally-generated high deployment force. The available strain energy for conducting deployment can be maximized to achieve the desired deployment force margin by the use of a highly unidirectional thin fiber-composite layup material for the roll-out boom, because the boom component of this invention is directionally controlled to always unroll in a known and predictable direction, without requiring a special (lower deployment force) bi-stable elastic laminate or elastic memory composite (EMC) material.

The invention also enables uniform stowage and secure packaging of the fragile solar cell-populated flexible blanket by maintaining a decoupled arrangement between the blanket longitudinal edges and the deployment structural elements, allowing either a rolled flexible photovoltaic blanket, or an accordion Z-folded flat-package arrangement to be implemented when stowed; and allowing either simultaneous or independent deployment of the boom structure and flexible blanket.

An elastic deployable boom system is disclosed. The boom system comprises one or more elastic roll out booms. Each roll out booms is a thin-wall tubular, elongated structure, having a first end, a second end opposite the first end, and a longitudinal axis. The boom system has a boom mandrel, a yoke structure, and a deployment control device. The boom mandrel, a substantially cylindrical structure, also has a longitudinal axis, as well as supporting structure operable for allowing the mandrel to rotate about the longitudinal axis of the boom mandrel. The yoke support structure provides a fixed base for deployment of each of the elastic roll out booms.

Each of the elastic roll out booms is attached at the first end to the boom mandrel and at the second end to the yoke structure such that the longitudinal axis of the roll out boom is perpendicular to the longitudinal axis of the boom mandrel. The elastic roll out boom cross section can be flattened and rolled tightly around the boom mandrel to form a stowed roll. The stowed roll is operable for storing elastic strain energy sufficient for powering deployment. The deployment control device is operable for controlling the elastic strain energy during deployment such that unidirectional deployment of each of the elastic roll out booms is assured.

One embodiment of the deployment control device includes a stabilizer bar, stabilizer arms, boom control rollers, a deployment lanyard and a rotating pulley. The stabilizer arms connect the boom control rollers to the longitudinal axis of the boom mandrel. The deployment lanyard has a first end and a second end opposite the first end. The first end of the deployment lanyard is attached to the stabilizer bar and the second end of the deployment lanyard is attached to the rotating pulley. The rotating pulley is attached to the yoke support structure such that unidirectional boom deployment is effected.

A second embodiment of the deployment control device includes a stabilizer bar, stabilizer arms, boom control rollers, and a rotary damping mechanism. The rotary damping mechanism is connected in-line with the mandrel axis and controls the rate of mandrel rotation during deployment. This, in turn, effects unidirectional boom deployment.

A third embodiment of the deployment control device includes stabilizer arms and boom control rollers, a frictionless tensioned containment strap, and a strap cross bar. The stabilizer arms connect the boom control rollers to the longitudinal axis of the boom mandrel. The frictionless tensioned containment strap surrounds the stowed roll. One end of the containment strap is connected to the stabilizer bar, the other end is connected to the strap cross bar. The containment strap controls the rate of diameter reduction of the stowed roll during deployment which, in turn, effects unidirectional boom deployment.

The elastic deployable structure may include a flexible photovoltaic blanket. The flexible photovoltaic blanket is substantially planar, attached at one end to the boom mandrel, and at the opposite end to the yoke structure.

One embodiment of the elastic deployable structure includes a mandrel operable for simultaneous stowage of the elastic roll out booms and the flexible photovoltaic blanket. The elastic strain energy in the stowed arrangement is capable of powering simultaneous deployment of both the elastic roll out boom and the flexible photovoltaic blanket.

In a second embodiment of the elastic deployable structure is included the flexible photovoltaic blanket, a lateral blanket support structure, a base preload platen, and a tip preload platen. In this embodiment, the flexible photovoltaic blanket is operable for is stowage between the tip preload platen and the base preload platen as a z-fold flat package. Again, the elastic strain energy of the stowed roll is operable for powering simultaneous deployment of both the elastic roll out boom and the flexible photovoltaic blanket.

In a third embodiment of the elastic deployable structure is included a flexible photovoltaic blanket and a lateral blanket mandrel system. The lateral blanket mandrel system comprises a lateral blanket mandrel, a system of lanyards and pulleys, and an auxiliary electric motor. Here, deployment occurs in two stages. The elastic strain energy of the stowed roll is operable for powering initial deployment of the elastic roll out boom, while the lateral blanket mandrel system is operable for powering subsequent unrolling deployment of the flexible photovoltaic blanket.

In a fourth embodiment of the elastic deployable structure is included a flexible photovoltaic blanket, a base preload platen, a tip preload platen, and a lateral blanket mandrel system. The lateral blanket mandrel system comprises a lateral blanket mandrel, a system of lanyards and pulleys, and an auxiliary electric motor. The flexible photovoltaic blanket is stowed between the tip preload platen and the base preload platen as a z-fold flat package. Again, deployment occurs in two stages with the elastic strain energy of the stowed roll powering initial deployment of the elastic roll out boom, and the lateral blanket mandrel system powering subsequent unfolding deployment of the flexible photovoltaic blanket.

Other desirable features and characteristics of the present invention will become apparent from the subsequent detailed description of the invention and the appended claims, taken in conjunction with the accompanying drawings and this background of the invention.

DESCRIPTION

Glossary of Terms

Solar Array—A structure which is stowable in a small volume for shipment and launch, and that is deployable when in space to expose a large surface area of photovoltaic collectors (solar cells) to the sun, and that is mechanically and electrically attached to a spacecraft vehicle to provide power for spacecraft operations Flexible solar array—A solar array that includes a rollable or foldable thin flexible blanket or substrate to which the solar cells are mounted Roll out boom—A thin-walled metallic or composite reinforced slit-tube (open section) or closed section hollow structural member. One or more booms can be used as the primary longitudinal deployment and deployed structural member of the solar array. The thin-walled elastic nature of the booms allow them to be flattened and rolled up into an extremely compact stowage volume.

Elastic roll out boom—A roll out boom that that is constructed such that it is self-deploying elastically though its own internal strain energy; and remains in the elastic state when rolled up. The elastic roll out boom does not require passive heating or active heating on the structural tubular member to actuate deployment, and provides its own sufficiently high deployment force. The available strain energy for conducting deployment may be maximized to achieve the required deployment force margin by the use of a primarily unidirectional thin fiber-composite laminate.

Deployment control—A method of restraining when rolled, and deploying an elastic roll out boom with a longitudinally-oriented unidirectional thin composite layup so it unrolls in a known and predictable direction, with maximum deployment torque, and without requiring a special (lower deployment force) bi-stable elastic laminate or elastic memory composite (EMC) material.

Directionally-controlled elastic roll out boom—A roll out boom that that is constructed such that it is self-deploying elastically though its own internal strain energy, remains in the elastic state when rolled up; and is directionally-controlled by incorporating one or more methods of deployment control so it unrolls in a known and unidirectional manner.

Mandrel—A hollow lightweight tube onto which the roll out booms and/or the planar flexible PV blanket is rolled onto for compact stowage.

Flexible photovoltaic (PV) blanket—A thin flexible substrate that has mounted to it an array of photovoltaic solar cells and associated wiring that can be rolled or folded into a small package for stowage; and is attached to the deployable solar array structure (except for the longitudinal booms) for unfurling into a flat, tensioned configuration during deployment.

Yoke support structure—The lateral base structural support of the solar array onto which the longitudinal booms and flexible blanket are attached. Also can provide a mounting location for the standoff yoke which can attach the solar array to the spacecraft body.

Batten—A lateral structural cross member that is attached between two longitudinal roll out booms, but not attached to the flexible PV blanket; to provide added structural stiffness and/or strength to the deployed solar array.

Stabilizer bar—A lateral member that spans across an elastic roll out boom mandrel, and can rotate about the mandrel axis; and provides mounting for the deployment control rollers and/or deployment rate limit lanyard Blanket support structure—a lateral structural member that spans between the two roll out boom mandrels and provides mounting interface for the leading edge of a roll out or Z-folded PV blanket during deployment and when fully deployed.

Preload platen (tip or base)—The rigid panels to which the tip and base of an accordion Z-folded flexible PV blanket are attached, and when fully stowed sandwich the one or more accordion Z-folded flexible PV blankets between the tip preload platen and the base preload platen in order to preload and protect the fragile solar cells against damage during launch vibratory loading.

Blanket unfurl lanyards—longitudinal chords or metal strips that deploy out from a reel during initial elastic boom structure deployment of a two-stage deployment system; after full deployment with the boom structure, the blanket unfurl lanyards provide a known guide for the subsequent unrolling (rolled) or unfolding (Z-fold) of the flexible Z-fold blanket.

DESCRIPTION OF ITEMS IN THE FIGURES

101—Spacecraft (satellite) body: The primary structure to which the solar array(s) are mounted to and provide power for; that carries payloads and is launched into space.

102—Deployed solar array wing: A structure which is stowable in a small volume for shipment and launch, and that is deployable when in space to expose a large surface area of photovoltaic collectors (solar cells) to the sun, and that is attached to certain spacecraft vehicles, to provide power for spacecraft operations.

201—Directionally-controlled elastic roll out boom: A roll out boom that that is constructed such that it is self-deploying elastically though its own internal strain energy; and remains in the elastic state when rolled up. The elastic roll out boom does not require passive heating or active heating on the structural tubular member to actuate deployment, and provides its own sufficiently high deployment force. The elastic boom component is directionally controlled to always unroll in a known and predictable direction using one or more methods of deployment control such as boom control rollers (507) and/or straps (701, 702). The available strain energy for conducting deployment may be maximized to achieve the required deployment force margin by the use of a primarily unidirectional thin fiber-composite laminate.

202—Yoke support structure: The lateral base structural support of the solar array onto which the longitudinal booms (201) and flexible blanket (204) are attached. Also can provide a mounting location for the standoff yoke which can attach the solar array to, and provide an offset from, the spacecraft body or gimbal.

203—Mandrel: A hollow lightweight tube onto which the elastic roll out booms (201) and/or the planar flexible PV blanket (204) is rolled onto for compact stowage.

204—Flexible Photovoltaic (PV) blanket: A thin flexible substrate that has mounted to it an array of photovoltaic solar cells and associated wiring that can be rolled or folded into a small package for stowage; and is attached to the deployable solar array structure for unfurling into a flat, tensioned configuration during deployment.

205—Blanket springs: Springs mounted to the flexible PV blanket (204) lateral edge that allow the uncoupled flexible PV blanket (204) to roll up at the same rate and diameter as the elastic roll out booms (201) and be under uniform tension when fully deployed.

301—Compressible open cell foam: Open-cell foam applied to the back (non-cell populated) side of the flexible PV blanket (204) in various forms such as strips, patches or continuous sheets. When the blanket is rolled for stowage, the foam is compressed to take up the differential spacing between the elastic boom roll diameter and the blanket roll diameter so they remain the same. When fully compressed in between the rolled (or Z-folded) flexible PV blanket layers in the stowed configuration, the foam provides preload pressure and damping to protect the fragile solar cells against damage during launch vibratory loading.

302—Mandrel ends: A component mounted to the mandrel (203) that closes out the thin tubular section at the ends and that may provide mechanical features that allow for the stowed elastic roll-out boom (201) restraint during launch, and a mounting interface for bearings located at the mandrel longitudinal axis of rotation.

303—Launch tie bracket: Structural element mounted to the yoke support structure (202) that reacts against the mandrel ends (302) to locate and secure them tightly in the stowed configuration for launch.

304—Launch hold-down mechanism (or launch tie restraints): A releasable device that preloads the mandrel ends (302) tightly against a launch tie bracket (303) mounted to the yoke support structure (202) in the stowed position. When the launch hold-down mechanism (304) is released deployment of the solar array is initiated.

401—Batten: A lateral structural member that spans between deployed elastic roll out booms (201), is uncoupled from the flexible PV blanket (204), and when deployed may help to increase the deployed structural strength and/or stiffness.

501—Deployment lanyard: A cable, tape or strap that can be wrapped around a pulley or spool and is paid out slowly with a rotary damper (503), motor or other damping means to limit the rate of deployment of the solar array.

502—Deployment lanyard reel: A circular grooved pulley that allows the deployment lanyard to roll up onto and extend from as it rotates during deployment.

503—Rotary damper: A rate-limiting device that limits the rotational speed of the deployment lanyard reel (502) and corresponding extension of the deployment lanyard to limit the rate of deployment of the solar array.

504—Mandrel axis: The longitudinal centerline axis of the mandrel (203) about which it rotates during deployment.

505—Stabilizer bar: Component that spans the width of the mandrel (203) and is attached to the mandrel at its ends via mandrel bearings (506) so that it can rotate about the mandrel axis (504). Boom control rollers (507) may be attached to the stabilizer bar (505) and positioned so that when the deployment lanyard (501) is under tension due to the reaction of the elastic roll out boom (201) deployment force, the boom control rollers (507) are preloaded by the stabilizer bar (505) to provide localized loading throughout deployment to assist in the required deployment control of each elastic roll out boom (201).

506—Mandrel bearings: Rotating bearings or bushings mounted to the mandrel ends (302) and allow rotation of the mandrel (203) relative to the stabilizer bar (505) about the mandrel axis (504).

507—Boom control rollers: Component attached to the stabilizer bar (505) and positioned so that when the deployment lanyard (501) is under tension due to the reaction of the elastic roll out boom (201) deployment force, the boom control rollers (507) are preloaded by the stabilizer bar (505) against the roll out boom (201) underside at a location nearly tangent to the rolled portion of the elastic roll out boom (201). The preloaded boom control rollers (507) provide localized loading throughout deployment to provide deployment control of each elastic roll out boom (201).

508—Stabilizer arm: A rigid rod that connects the stabilizer bar (505) longitudinal axis with the boom mandrel axis (504) and allows relative rotational motion between the stabilizer bar (505) and the boom mandrel axis (504)

601—Inter-wrap attachment strips: Hook and loop or other high friction materials located on the opposing surfaces of the elastic roll out boom (201); and that come into contact when the elastic roll out boom is packaged by rolling and provide roll out boom (201) deployment control.

602—Open-section elastic roll out boom: An embodiment of the elastic roll out boom whereby the circular boom cross section is broken by a longitudinal slit that allows elastic flattening and subsequent rolling for stowage.

603—Roll out boom (201) inside surface: The interior surface of an open-section roll out boom (602) onto which inter-wrap attachment strips (601) are attached.

604—Roll out boom (201) outer exposed surface: The exposed outer surface of a rolled or unrolling elastic roll out boom (201), upon which inter-wrap attachment strips (601) are attached, and to which a radial load may be applied by a roller or strap to provide a means of deployment control.

605—Closed-section elastic roll out boom: An embodiment of the elastic roll out boom whereby the boom cross section is continuous and formed into a shape that allows elastic flattening and subsequent rolling for stowage.

606—Non-Controlled elastic roll out boom: An elastic roll out boom that has no form of boom control implemented and therefore "blossoms" upon release from the rolled state because adjacent rolled layers are unconstrained to move in shear relative to each other.

701—Spring loaded sliding containment strap: External strap that applies a radial load to constrain the stowed rolled boom layers from "blossoming", and assist in the required deployment control of each directionally controlled elastic roll out boom (201). The strap may consist of low-friction sliding materials that slide directly on the directionally controlled elastic roll out boom (201) outer exposed surface (604) during deployment.

702—Spring loaded rolling containment strap: External strap that consists of integral strap rollers (703) that allow the rolling strap (702) to roll along the directionally controlled elastic roll out boom (201) outer exposed surface (604) during deployment with minimal friction.

703—Integral strap rollers: Rolling elements integrated into a boom control strap that allow it to roll with low friction on the boom outer exposed surface (604)

704—Strap tensioning springs: Springs utilized to apply tension to the sliding (701) or rolling (702) straps as a means of providing boom deployment control

705—Strap cross bar: member that terminates in the strap (701, 702) end and provides structural mounting for the strap tensioning springs (704) that span between it and the stabilizer bar (505) to apply the required strap tension.

901—Mandrel, Boom mandrel: Same definition as (203) except as applied to embodiment of FIG. 9; a mandrel upon which a single directionally controlled elastic roll out boom (201) is rolled onto.

902—Blanket support structure: A structure attached to each of the boom mandrels (901) that spans between them and is located at the tip of the array structure when deployed. The flexible PV blanket assembly (204) may be attached to the deployable structural subsystem at the lateral blanket support structure (902).

903—Base preload platen: A rigid platen (such as made from honeycomb panel) attached to the yoke support structure (202), that provides a stiff and strong base for preloading a Z-folded PV blanket (204) and foam (301) stack in conjunction with the tip preload platen (1001).

904—Longitudinal blanket strips: Thin metal, composite or fabric longitudinal blanket members that bend to allow hinge lines, and stowage of the flexible PV blanket (204) in an accordion Z-folded arrangement.

905—SPMs: Solar cell-populated panel modules that may be constructed of a lightweight substrate material such as Kapton, Kevlar, Glass Epoxy or Graphite Epoxy to which the individual solar cells are bonded and interconnected together into series strings to produce the required electrical performance when illuminated by the sun.

906—Outermost PV blanket SPM: Light weight rigid panel that serves a dual purpose as an SPM solar cell substrate when deployed and a tip preload platen (1001) when stowed, and when fully stowed forms a flat-package comprised of a Z-folded flexible planar blanket (204) that is sandwiched between the tip preload platen (1001) and the base preload platen (903).

1001—Tip preload platen: A rigid platen (such as made from honeycomb panel) attached to the blanket support structure (902), that provides a stiff and strong top plate for preloading a Z-folded PV blanket (204) and foam (301) stack in conjunction with the base preload platen (903).

1101—Blanket stack launch tie down mechanism: Mechanism containing a frangible bolt, or equivalent method release actuator; and positioned to run through the Z-fold stack through holes provided therein, or around the perimeter of the stack; and attached at the base yoke support structure (202), to introduce a compressive preload in the stowed Z-folded flexible PV blanket (204) and foam (301) stack.

1301—Blanket mandrel—Same definition as (203) except as applied to the embodiment of FIG. 12; and used exclusively for rolling and unrolling of the rolled flexible PV blanket (204) independent of the elastic roll out booms (201).

1302—Blanket mandrel bearings: Bearings located on the sides of the blanket mandrel of embodiment of FIG. 12, and that allow independent rotation of the blanket mandrel relative to the boom mandrel (901) to enable a two-stage deployment (i.e. elastic boom (201) deployment first, then flexible PV blanket (204) deployment second).

1303—Blanket unfurl lanyards: Longitudinal chords or metal strips that deploy out from a reel during initial elastic boom structure deployment of a two-stage deployment system; after full deployment with the boom structure, the blanket unfurl lanyards provide a known guide for the subsequent unrolling (rolled) or unfolding (Z-fold) of the flexible Z-fold blanket (907).

1304—Lanyard pulley reels: A circular grooved pulley that allows the blanket unfurl lanyards (1303) to roll up onto and extend from as it rotates during deployment.

1305—Lanyard pulley bearings: Bearings mounted to the lanyard pulley reels (1304) that allow their rotation and paying out of the blanket unfurl lanyards (1303).

1306—Tip pulleys: A circular grooved pulley that allows the blanket unfurl lanyards (1303) to roll up onto and over the tip of the array structure, extending the blanket unfurl lanyards (1303) as the blanket support structure (902) translates out with the booms (201) and rotates during deployment.

1401—Auxiliary electric motor: An electric motor that is mounted such that it provides the motive torque to rotate the lanyard pulley reels (1304) about the lanyard pulley bearings (1305), allowing the blanket unfurl lanyards (1303) to be reeled onto their pulley reels (1304) and subsequently unfurling the flexible PV blanket (204) until fully deployed.

DESCRIPTION OF THE FIGURES

FIG. 5: shows an embodiment of the invention that utilizes a deployment lanyard (501) and rotary damper (502) system attached to the yoke support structure (202) at the base and a stabilizer bar (504) at the tip for limiting deployment rate;

FIG. 6c: shows an embodiment of the invention that uses facing inter-wrap attachment strips (601) of hook and loop or other high friction materials on the opposing surfaces of the elastic roll out boom (201) to that provides high resistance to shearing between the rolled boom layers when stowed and throughout deployment as a means of elastic roll out boom (201) deployment control;

FIG. 7: shows an embodiment of the invention that uses external sliding or rolling spring-loaded straps (602) as a means of elastic roll out boom (201) deployment control;

FIG. 8: is a perspective view of a solar array system in accordance with an embodiment of the present invention having a single roll out boom (701) and two rolled flexible PV blankets (704); in the fully deployed configuration;

FIG. 15: is perspective views of a solar array system in accordance with an embodiment of the present invention having two roll out booms and a single Z-folded flexible PV blanket; in the various stages of deployment; and with independent deployment of elastic boom structure and Z-folded flexible PV blanket from a blanket flat package located at the base;

DETAILED DESCRIPTION OF THE EMBODIMENTS

Figure 1:
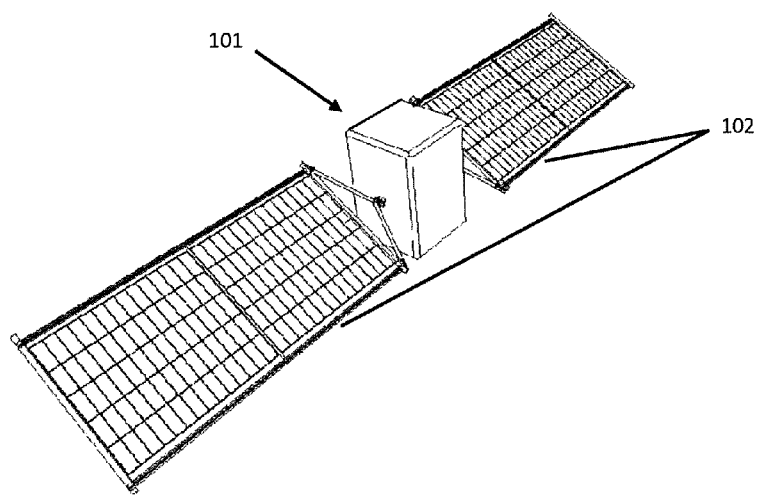
FIG. 1: is a perspective view of a typical spacecraft (101) that uses flexible solar arrays (102) for power production.
Figure 2:
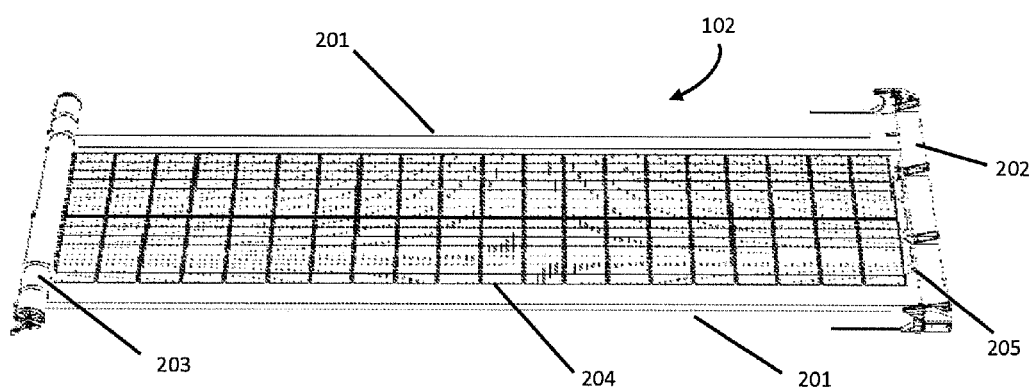
FIG. 2: is a perspective view of a solar array system in accordance with an exemplary embodiment of the present invention having two directionally controlled elastic roll out booms (201) and a single rolled flexible photovoltaic (PV) blanket (204); in the fully deployed configuration.

FIG. 1 shows a typical spacecraft (101) that uses flexible solar arrays for power production. A solar array (102) according to this invention includes one or more longitudinal elastic roll out booms (201); one lateral mandrel (203) or one or more lateral boom mandrels (901); one or more lateral blanket attachment support structures (902), one base support yoke structure (202), one or more lateral battens (401), and one or more planar flexible photovoltaic (PV) blankets (204) attached to the lateral mandrel (203) and base support yoke structure (202). The flexible photovoltaic blankets (204) may be packaged in a rolled or Z-folded configuration and remain uncoupled to the elastic roll out booms (201) along their longitudinal edges. The elastic roll out booms (201) may be comprised of closed sections or open sections that allow for rolled packaging. Structural deployment is motivated by the elastic strain energy of the one or more elastic roll out booms (201), and one or more methods of deployment control are provided to ensure a straight and known unrolling deployment path of the one or more elastic roll out booms (201).

Figure 3:
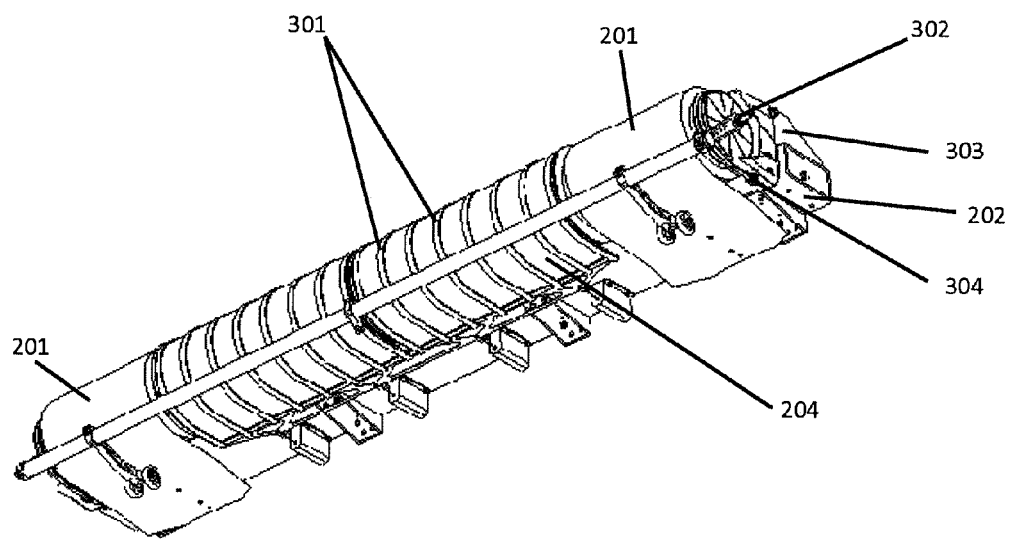
FIG. 3: is a perspective view of a solar array system in accordance with an exemplary embodiment of the present invention having two directionally controlled elastic roll out booms (201) and a single rolled flexible PV blanket (204); in the stowed packaged configuration.

One embodiment of the deployable solar array structural system (shown in FIGS. 2,3 and 4a-c) is composed of two longitudinally-oriented thin-walled elastic roll out booms (201) that are attached together laterally at the base to a yoke support structure (202) and laterally at the tip to a mandrel (203). The mandrel (203) consists of a hollow lightweight tube onto which the roll out booms and the planar flexible PV blanket (204) is rolled onto. The flexible PV blanket assembly (204) is attached to the deployable structural subsystem at the mandrel (tip) (203) and at the yoke support structure (root) (202) along their respective lengths, and may be attached rigidly, or with longitudinally-oriented blanket springs (205) that allow the flexible PV blanket (204) to roll up at the same rate and diameter as the elastic roll out booms (201) and be under tension when fully deployed. To allow rolled packaging of the flexible PV blanket (204) into a diameter that is the same as the rolled packaging of the roll out booms (201), and to allow deployment unrolling at the same rate and also to allow for independent tensioning of the blanket to provide desired first mode frequency, the flexible PV blanket (204) is not attached (i.e. uncoupled) to the roll out boom (201) along its longitudinal length. As shown in FIG. 3, compressible open cell foam (301), such as made from polyimide material, is mounted to the back side (non-solar cell populated side) of the flexible PV blanket (204) in strips, patches or as a continuous sheet. When the flexible PV blanket (204) is rolled for stowage, the foam is compressed to take up the differential spacing between the elastic roll out boom (201) rolled diameter and the PV blanket (204) roll diameter so they remain the same. When fully compressed in between the rolled flexible PV blanket (204) layers in the stowed configuration, the compressible foam (301) provides preload pressure and damping to protect the fragile solar cells against damage during launch vibratory loading.

Figure 4A:
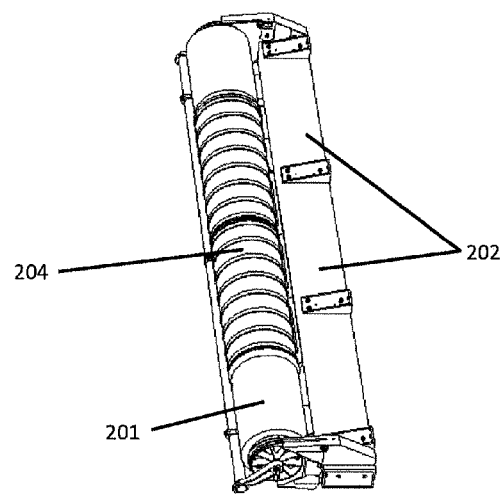
FIGS. 4a, 4b, 4c: contains perspective views of a solar array system in various stages of deployment; starting from fully stowed (FIG. 4a), to partially-deployed (FIG. 4b), to fully deployed (FIG. 4c), in accordance with an exemplary embodiment of the present invention.
Figure 4B:
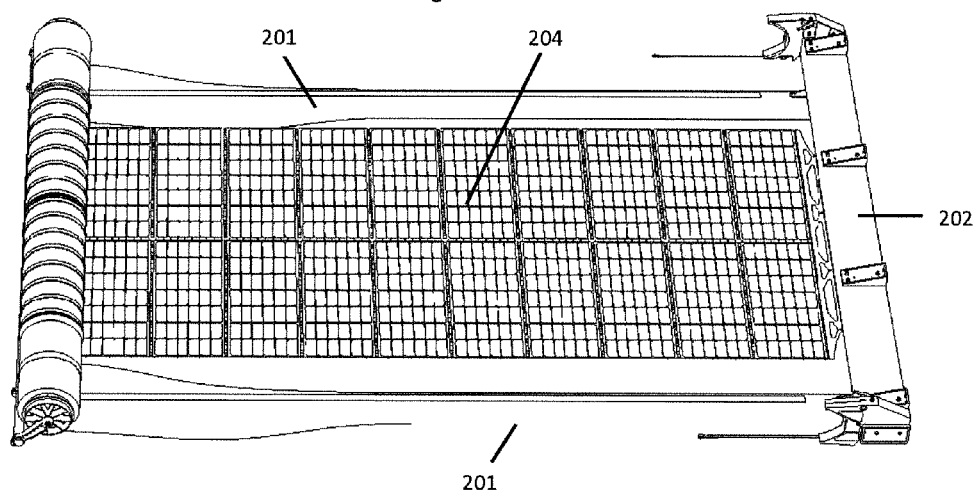
Figure 4C:
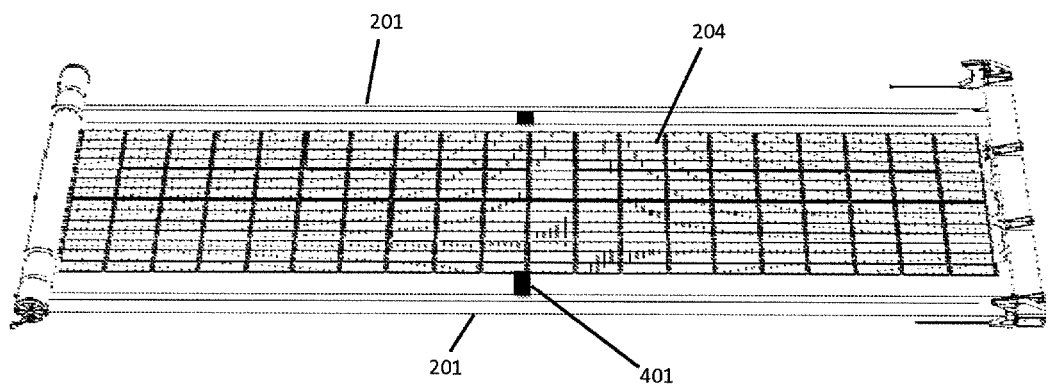

When packaged in the stowed configuration for launch, the roll out booms may be restrained from elastically deploying by holding the mandrel ends (302) tightly against a launch tie bracket (303) mounted to the yoke support structure (202) with a releasable strap, frangible bolt mechanism, or other equivalent launch hold-down mechanism (304), as shown in FIG. 3. When the launch hold-down mechanism (304) is released to initiate deployment of the solar array, the roll out booms (201) elastically unroll. FIGS. 4a through 4c shows the solar array system of this embodiment in various stages of deployment; starting from fully stowed (FIG. 4a), to partially-deployed (FIG. 4b), to fully deployed (FIG. 4c). The unrolling torque of the elastic roll-out booms (201) about the mandrel (203) axis (504), provide the motive force for longitudinal deployment (unrolling) of the rolled flexible PV blanket (204).

The elastic roll out booms (201) may be either open section (slit tube) or closed section that allow flattening prior to and during rolling to enable a flat rolled packaging onto the mandrel (203). The elastic roll out booms (201) may be constructed from a fiber-reinforced composite, with a majority of the fibers directionally oriented along the longitudinal axis of the roll out boom, or they may be of metallic construction. One or more lateral battens (401) may be attached to the roll out booms (201) to enhance the solar array deployed structural stiffness and/or strength, but remain uncoupled to the flexible PV blanket (204) to allow independent blanket tensioning.

In one embodiment of the deployable solar array system, shown in FIG. 5, the elastic boom (201) unrolling may be limited in deployment rate by paying out a deployment lanyard (501) longitudinally from deployment lanyard reel attached (502) to a rate limiting device such as a rotary damper (503) located on the yoke support structure (202). The rotary damper (503) may alternately be located directly on the mandrel axis (504), allowing for elimination of the deployment lanyard (501). Alternatively, a motor and gear head arrangement may be used in place of the rotary damper to pay out the deployment lanyard (501) at a desired rate. One end of the deployment lanyard (501) may be attached to a stabilizer bar (505) that spans the width of the mandrel (203) and is attached to the mandrel (203) at its ends via perpendicular stabilizer arms (508) and mandrel bearings (506) so that it can rotate about the mandrel axis (504).

Boom control rollers (507) may be attached to the stabilizer bar (505) and positioned so that when the deployment lanyard (501) is under tension due to the reaction of the directionally controlled elastic roll out boom (201) deployment force, the boom control rollers (507) are preloaded by the stabilizer bar (505) against the directionally controlled roll out boom (201) underside at a location nearly tangent to the outer unwrapping portion of the directionally controlled elastic roll out boom (201). The preloaded boom control rollers (507) provide localized loading throughout deployment to assist in the required deployment control of each directionally controlled elastic roll out boom (201). The boom control rollers (507) may be used in combination with other methods of boom deployment control to further enhance directionally controlled elastic roll out boom (201) deployment control.

An alternate embodiment of the boom control rollers (507) is for the preload to be provided by reacting the torque generated by damped relative rotation between the mandrel (203) and the stabilizer bar (505) about the mandrel axis (504). This torque is developed by the placement of a rotary damper at the mandrel axis (504) that limits relative rotational speed between the two, and allows elimination of the deployment lanyard for deployment rate limiting.

Figure 6A:
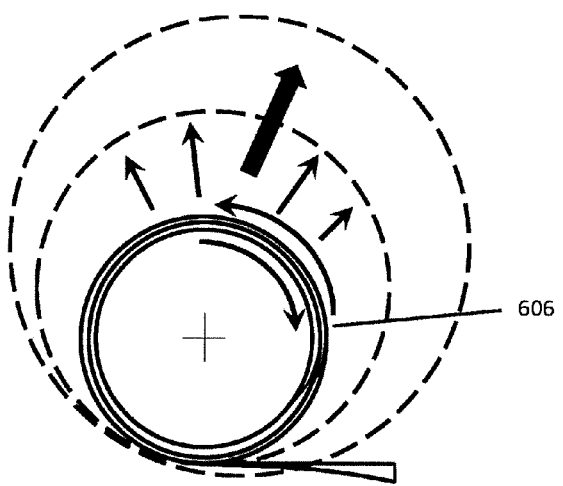
FIG. 6a: shows a rolled elastic boom with no form of deployment control, where upon release, the non-controlled boom (606) rolled layers are allowed to shear relative to one another and each progressive wrap then expands in a radial direction (blossom); and the net direction of deployment is unknown.
Figure 6B:
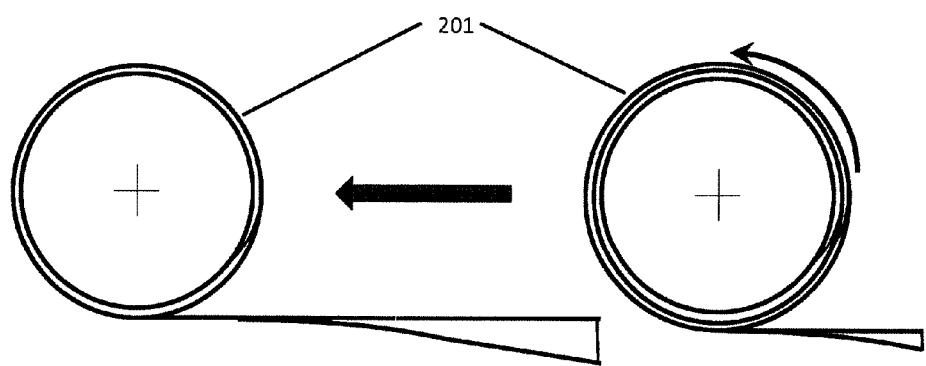
FIG. 6b: shows the desired unrolling motion of a directionally controlled elastic roll out boom (201) in a known, unidirectional manner that is achieved with the implementation of a deployment control method that prevents relative shearing motion between the boom layers upon release.

In embodiments where the elastic roll-out booms (201) are constructed such that they are made of a reinforced fiber composite material or metal, the material properties are such that the booms are not "bi-stable" in nature (i.e. they are highly unidirectional in the longitudinal direction), and they remain linear elastic throughout rolling and unrolling; they require one or more methods of boom deployment control to so that the directionally controlled elastic roll out boom (201) unrolls in a known, straight and predictable direction. The boom deployment control is required to prevent "blossoming" radially due to unrestrained shear displacement between rolled layers, as shown in FIG. 6a where upon release, the non-controlled boom (606) rolled layers are allowed to shear relative to one another and each progressive wrap then expands in a radial direction; and the net direction of deployment is unknown. FIG. 6b shows the desired unrolling motion of a directionally controlled elastic roll out boom (201) in a known, unidirectional manner that is achieved with the implementation of a deployment control method that prevents relative shearing motion between the boom layers upon release. As shown in FIG. 6c, a method for achieving the necessary elastic roll out boom (201) deployment control is to apply a material that provides high resistance to shearing between the rolled boom layers when stowed and throughout deployment, such as facing inter-wrap attachment strips (601) of hook and loop or other high friction materials on the opposing surfaces of the directionally controlled elastic roll out boom (201); and that come into contact when the elastic roll out boom is packaged by rolling. As shown in FIG. 6, for an open-section elastic roll out boom (602) one half of the inter-wrap attachment strip is attached longitudinally to the inside surface (603) and the opposing half is attached longitudinally to the outside surface (604) so that they come into high-friction contact when the open section elastic roll out boom is flattened and rolled, preventing shear motion (and resultant "blossoming") during unrolling deployment. For the embodiment using a closed-section elastic roll out boom (605), one half of the inter-wrap attachment strip is attached longitudinally to the outside surface (604) and the opposing half is attached to the opposing outside surface (604) so that they come into high-friction contact when the open section elastic roll out boom is flattened and rolled, preventing shear motion (and resultant "blossoming") during unrolling deployment.

Boom control rollers (507) may be used as previously described and in combination with the inter-wrap attachment strips (601) to further enhance roll out boom (201) deployment control.

In another embodiment of the invention shown in FIG. 7, deployment control of the roll out booms (201) may be accomplished with an external spring-tensioned sliding containment strap (701) or rolling containment strap (702) that applies a radial load to constrain the rolled boom layers from "blossoming", and assist in the required deployment control of each elastic roll out boom (201). The external sliding containment strap (701) or rolling containment strap (702) may be used in combination with the inter-wrap attachment strips (601) to further enhance roll out boom (201) deployment control. The strap may consist of low-friction sliding materials that slide directly on the roll out boom (201) outer exposed surface (603) during deployment. Alternatively the strap may consist of integral rollers within the strap (703) that allow the rolling containment strap (702) to roll along the roll out boom (201) outer exposed surface (603) during deployment with minimal friction. The containment strap (701, 702) is pulled radially tight around the rolled elastic boom (201) outer exposed circumference (603) with strap tensioning springs (704) that provide sufficient strap tension to allow boom containment and deployment control. The strap may be terminated on one end with a strap cross bar (705) that also provides a structural mounting for the strap tensioning springs (704) that span between the cross bar (705) and the stabilizer bar (505) to apply the required strap tension.

Another embodiment of the deployable solar array structural system (shown in FIG. 8) is composed of a single longitudinally-oriented thin-walled elastic roll out boom (801) that is attached at the base to a yoke support structure (802) and at the tip to a lateral mandrel (803). The mandrel (803) consists of a hollow lightweight tube onto which the roll out boom (801) and the two planer flexible PV blankets (804) are rolled. The flexible PV blanket assemblies (804) are each attached to the deployable structural subsystem at the mandrel (803) and at the yoke support structure (802) along their respective ends, and may be attached via blanket springs (805) to allow for tensioning of the blanket when fully deployed. In order to allow rolled packaging of the flexible PV blankets (804) into diameters that are the same as the rolled packaging of the roll out boom (801), and to allow deployment unrolling at the same rate; the flexible PV blankets (804) are not attached (i.e. uncoupled) to the elastic roll out boom (801) along its longitudinal length.

Figure 9:
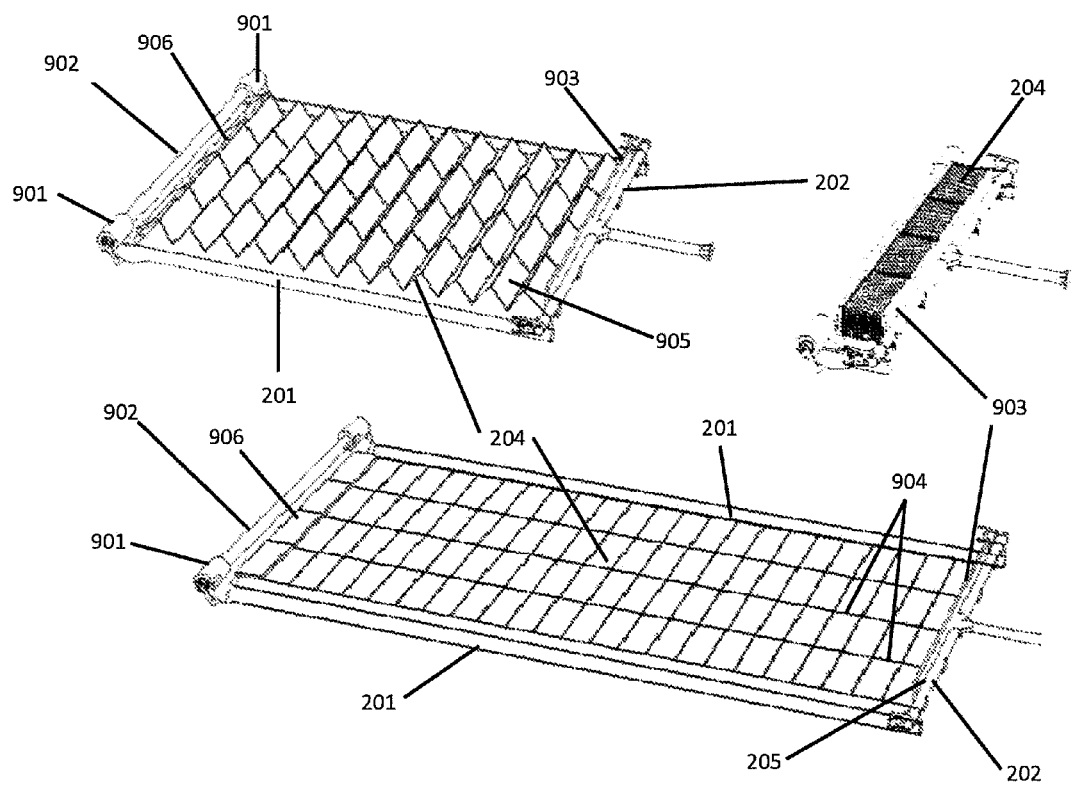
FIG. 9: a perspective view of a solar array system in accordance with an embodiment of the present invention having two elastic roll out booms (801) and a single Z-folded flexible PV blanket (807); in the stowed, deploying and fully deployed configurations.

Another embodiment of the deployable solar array structural system (shown in FIG. 9) is composed of two longitudinally-oriented thin-walled elastic roll out booms (201). The elastic roll out booms (201) are attached together laterally at the base to a yoke support structure (202) and laterally at the tip to two boom mandrels (901), consisting of a hollow lightweight tube onto which each roll out boom (201) is individually rolled onto. A lateral blanket support structure (902) is attached to each of the boom mandrels (901) and spans between them. The flexible PV blanket assembly (204) is attached to the deployable structural subsystem at the lateral blanket support structure (902) and at a base preload platen (903) attached to the yoke support structure (202) along their respective lengths, and may be attached with longitudinally-oriented blanket springs (205) that allow the flexible PV blanket (204) to be under tension when fully deployed. The flexible PV blanket (204) is hinged, or is manufactured from thin metal, composite or fabric longitudinal strips (904) that bend to allow hinging, and stowage in an accordion Z-folded arrangement, whereby adjacent discrete solar cell populated panel modules (or SPMs, 905) remain flat and fold up so their front side surfaces are face-to-face and their rear side surfaces are face-to-face when in the fully stowed flat-packaged configuration. The SPMs (905) may be constructed of a lightweight substrate material such as Kapton, Kevlar, Glass or Graphite Epoxy to which the individual solar cells are bonded and interconnected together into series strings to produce the required electrical performance when illuminated by the sun. The single outermost PV blanket SPM (906) may be comprised of a light weight rigid panel, such as honeycomb with thin face sheets, that serves as an SPM solar cell substrate (906) when deployed.

Figure 10:
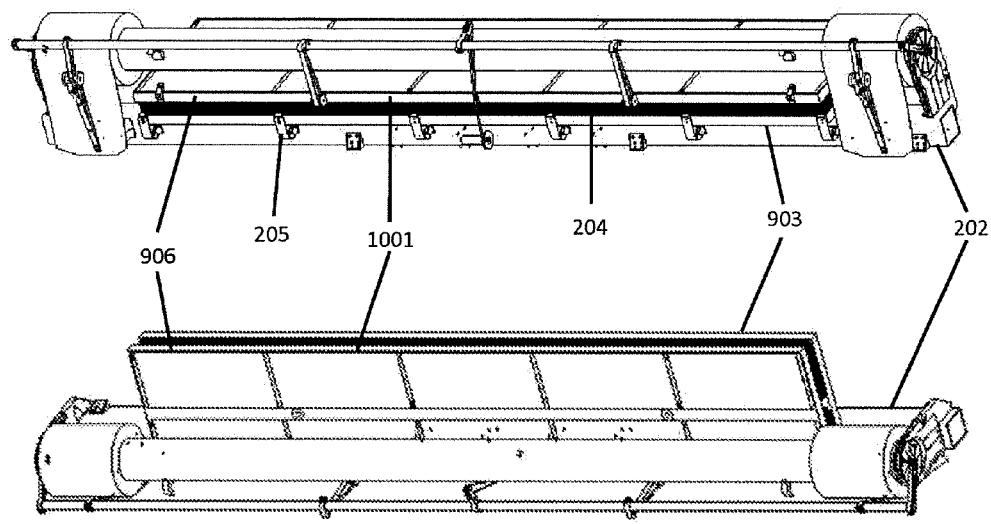
FIG. 10: is a perspective view of a solar array system in accordance with an exemplary embodiment of the present invention having two roll out booms (201) and a single Z-folded flexible blanket (204); in the stowed packaged configuration.

As shown in FIG. 10, the single outermost PV blanket SPM (906) comprised of a light weight rigid panel, serves a dual purpose as an SPM (905) solar cell substrate when deployed and a tip preload platen (1001) when stowed, and when fully stowed forms a flat-package comprised of a flexible PV blanket (204) that is folded and sandwiched between the tip preload platen (1001) and the base preload platen (805) in order to preload and protect the fragile solar cell-populated SPMs (905) against damage during launch vibratory loading. The flexible PV blanket SPMs (905) may have compressible open cell foam (301) attached to the back side (opposite the solar cells) in strips, patches or continuous sheets as required to provide cushioning and damping between the preloaded flexible PV blanket (204) layers and tip preload platen (1001) and base preload platen (905) for enhanced solar cell protection.

Figure 11:
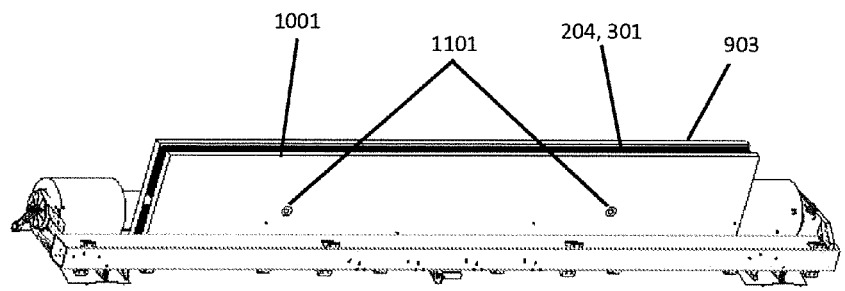
FIG. 11: is a perspective view of a solar array system in accordance with an exemplary embodiment of the present invention having a Z-folded flexible blanket stack (807); in the stowed packaged configuration; and having launch tie downs (1001) placed through the stack

In one embodiment of the Z-fold solar array system, shown in FIG. 11, the fully stowed Z-folded flexible PV blanket (204), foam (301) and tip platen (1001) and base preload platen (903) stack may be preloaded together at one or more locations with a blanket stack launch tie down mechanism (1101). The blanket stack launch tiedown mechanism (1101) may consist of a frangible bolt, or equivalent release actuation method, positioned to run through the tip/base preload platens (1001, 903), stowed blanket (204) and foam (301) stack through holes provided for the blanket stack launch tie downs (1101), or around the perimeter of the stack. The blanket stack launch tie downs (1101) may be attached (grounded) at the base yoke support structure (202), to introduce a compressive preload in the stowed Z-folded flexible PV blanket (204) stack.

Figure 12:
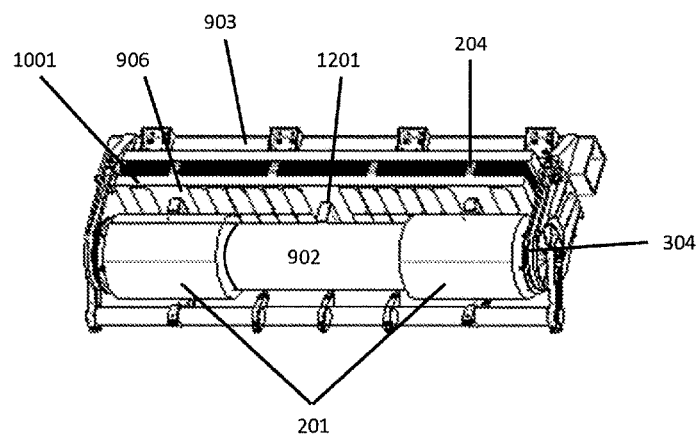
FIG. 12: is a view of a solar array system in accordance with an exemplary embodiment of the present invention having a Z-folded flexible blanket stack (907); in the stowed packaged configuration; and using the stowed restrained elastic roll out booms (201) and to apply the preload force.

In another embodiment of the Z-fold system shown in FIG. 12, the stowed and restrained booms (201) are located such that they themselves apply the desired compressive preload force to the flexible PV blanket stack layers (204), tip preload platen (1001) and base preload platen (903). This is accomplished by locating the lateral blanket support structure (902) so it directly bears on the tip platen (1001) via a snubber bracket (1201) that is rigidly attached to the tip platen (1001) when stowed, to provide PV blanket stack (204) preload for enhanced solar cell protection and to minimize stowed packaging volume. The snubber bracket (1201) is contoured so that it nests with the outer diameter of the lateral blanket support structure (902), and the lateral blanket support structure (902) is tightly held by the launch hold-down mechanism (304). Upon release of the launch hold-down mechanism (304) and deployment, the lateral blanket support structure (902) can pull away from the snubber bracket (1201).

Figure 13:
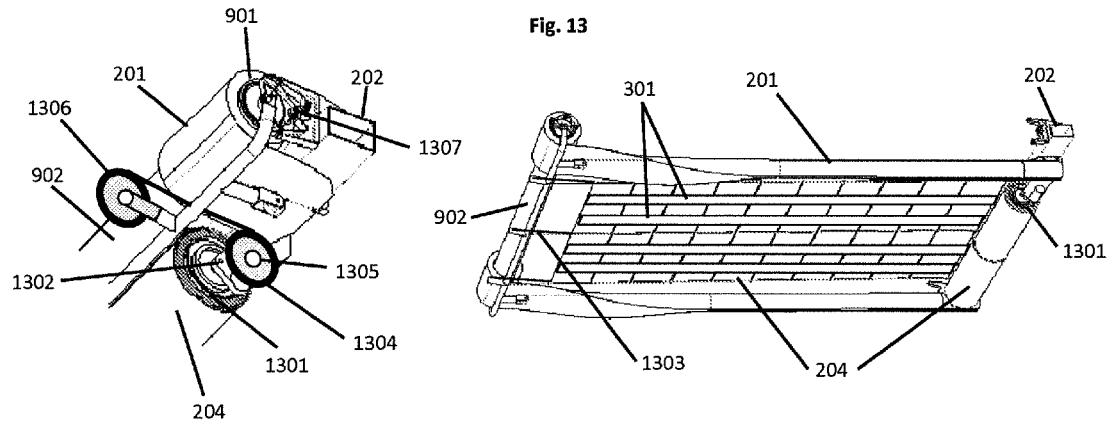
FIG. 13: is a perspective view of a solar array system in accordance with an exemplary embodiment of the present invention having two roll out booms and a single rolled flexible blanket; in the fully deployed configuration; and with independent deployment of elastic boom structure and rolled PV blanket from a blanket mandrel located at the base.

Another embodiment of the deployable solar array structural system using a rolled flexible PV blanket, shown in FIG. 13, consists of the deployable structure previously described comprising of two longitudinal roll out booms (201); two lateral boom mandrels (901) and a lateral blanket support structure (902) which is attached to each of the boom mandrels (901) and spans between them. A separate flexible PV blanket mandrel (1301) is located at the base and is centered between the elastic roll out booms (201) and attached to the base support yoke structure (202) via blanket mandrel bearings (1302) that allow it to rotate independently. In this unique embodiment, the rolled solar array assembly is stowed by rolling the two elastic roll out booms (201) and the flexible PV blanket (204) onto their own separate, independent mandrels (901), (1301). The tip end of the rolled flexible PV blanket (204) is attached to a plurality of blanket unfurl lanyards (1303) that have their opposite ends attached to lanyard pulley reels (1304) that are attached to the yoke support structure and allowed to rotate via lanyard pulley bearings (1305) and pay out or reel in the blanket unfurl lanyards (1303). The blanket unfurl lanyards are looped around tip pulleys (1306) located on the lateral blanket support structure (902). Restraint of the elastic roll out booms (201) in the stowed configuration for launch may be achieved in a manner as previously described, via boom launch tie restraints (304). Rolling and preload of the rolled flexible PV blanket (204) using open cell foam (301) is achieved in a manner as previously described. The rotation of the flexible PV blanket mandrel (1301) is restrained for launch at its ends similar to a method previously described for the boom launch restraints.

Figure 14:
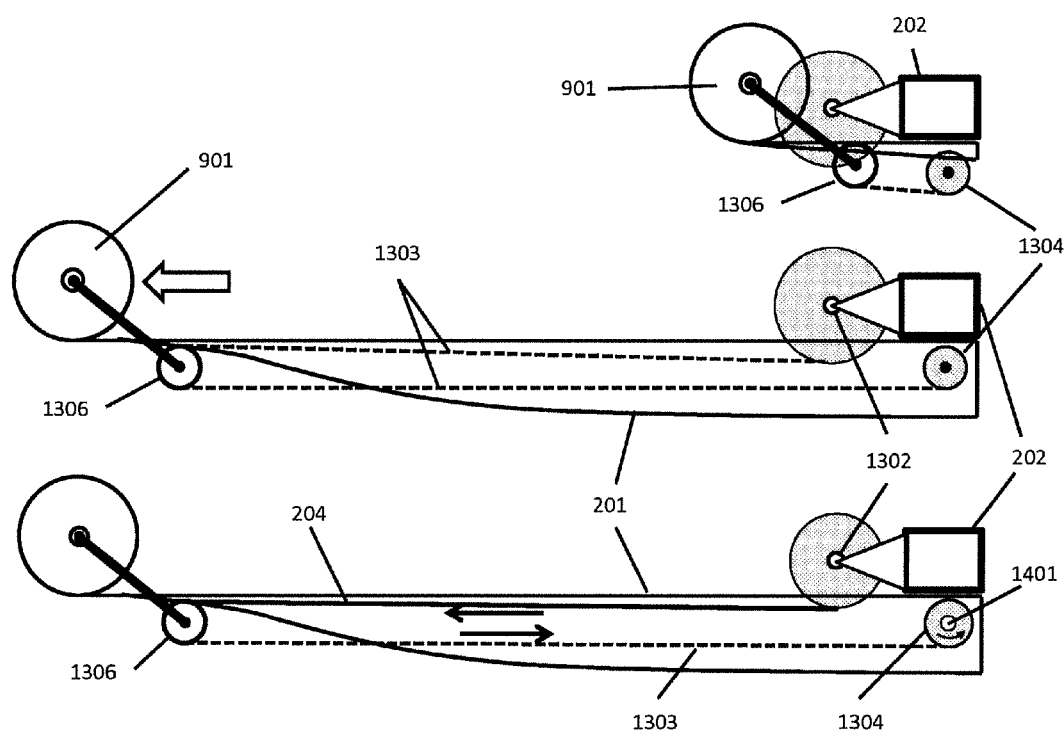
FIG. 14: solar array system in accordance with an exemplary embodiment of the present invention having two roll out booms and a single rolled flexible PV blanket; in the stages of deployment; and with independent deployment of elastic boom structure and rolled PV blanket from a blanket mandrel located at the base.

The deployment of this embodiment is performed in two stages, as shown in FIG. 14. In the first stage, the boom launch tie restraints (304) are released and the independent deployment of the roll out boom structure is motivated through elastic strain energy-driven unrolling of the elastic roll out booms (201). One or more methods of deployment control previously described (see FIGS. 6 and 7) are utilized to ensure a straight and known deployment path of the elastic roll out booms (201). Simultaneously with the elastic boom deployment, the blanket unfurl lanyards (1303) are paid out from the lanyard pulley reels (1304) longitudinally with the linear motion of the lateral blanket support structure (902) until full extension of the elastic booms (201) and blanket unfurl lanyards (1303) is achieved. In the second stage of deployment, the subsequent independent unrolling deployment of the rolled flexible PV blanket (204) is motivated through an auxiliary electric motor (1401) that is attached to the lanyard pulley reels (1304); and by reversing the direction of the lanyard pulley reel's (1304) rotation to reel in the blanket unfurl lanyards (1303) back onto their respective lanyard pulley reels (1304), simultaneously extending out (unfurling) the flexible PV blanket (204) by unrolling it from its blanket mandrel (1301) until it is fully deployed, planar and under tension. In order to allow separate deployment unrolling of the flexible PV blanket (204) that is independent of the elastic roll out booms (201), the flexible PV blanket (204) is not attached (i.e. uncoupled) to the roll out booms (201) along its two longitudinal edges.

In another embodiment of the deployable solar array structural system using a Z-fold flexible PV blanket (204), shown in FIG. 15, the deployable structure previously described comprising of two longitudinal roll out booms (201); two lateral boom mandrels (901) and a lateral blanket support structure (902) which is attached to each of the boom mandrels (901) and spans between them. A separate base preload platen (903) is located at the base and is centered between the elastic booms (201) and attached to the base support yoke structure (202). In this embodiment, the roll out booms (201) and the remaining solar array structure is stowed by rolling the two elastic roll out booms (201) onto their own separate, independent mandrels (901), and by simultaneously packaging the flexible PV blanket (204) in an accordion Z-folded arrangement, whereby adjacent discrete hinged solar cell populated panel modules, or SPMs (905) remain flat and fold up so their front side surfaces are face-to-face and their rear side surfaces are face-to-face when in the fully stowed flat-packaged configuration, as shown in FIG. 15. The single outermost PV blanket SPM (906) is comprised of a light weight rigid panel, such as honeycomb with thin face sheets, that serves a dual purpose as an SPM (905) solar cell substrate when deployed and a tip preload platen (1001) when stowed. When fully stowed a flat-package stack is formed, comprised of the Z-folded flexible PV blanket (204) that is sandwiched between the tip preload platen (1001) and the base preload platen (903) in order to preload and protect the fragile solar cells against damage during launch vibratory loading. The flexible PV blanket (204) may have compressible open cell foam (301) attached to the back side (opposite the solar cells) in strips, patches or continuous sheets as required to provide cushioning and damping between the preloaded PV blanket (204) layers and tip/base platens (1001), (903) for enhanced solar cell protection.

The tip preload platen is attached to a plurality of blanket unfurl lanyards (1303) that have their opposite ends attached to lanyard pulley reels (1304) that are attached to the yoke support structure (202) and allowed to rotate via pulley bearings (1305) and pay out the blanket unfurl lanyards (1303). The blanket unfurl lanyards (1303) may be looped around tip pulleys (1306) located on the lateral blanket support (902). Restraint of the elastic roll out booms (201) in the stowed configuration for launch may be achieved with boom launch hold-downs (304) in a manner as previously described. The restraint for launch of the preloaded flexible PV blanket (204) and tip/base platens (1001), (903) may be performed using blanket stack launch tie downs (1101) similar to methods previously described. The deployment of this embodiment is performed in two stages, as shown in FIG. 15. In the first stage, the boom launch tie restraints (304) are released and the independent deployment of the elastic roll out booms (201) is motivated through elastic strain energy-driven unrolling of the roll out booms (201); and one or more methods of deployment control previously described are utilized to ensure a straight and known deployment path of the elastic roll out booms (201). Simultaneously with the elastic boom roll out boom (201) deployment, the blanket unfurl lanyards (1303) are paid out from the lanyard pulley reels (1304) longitudinally with the linear motion of the lateral blanket support structure (902) until full extension of the elastic roll out boom (901) structure and blanket unfurl lanyards (1303) is achieved. In the second stage of deployment, the subsequent independent unfolding deployment of the Z-folded flexible PV blanket (204) is motivated through an auxiliary electric motor (1401) that is attached to the lanyard pulley reels (1304). By reversing the direction of the lanyard pulley reel's (1304) rotation to reel in the blanket unfurl lanyards (1303) back onto their respective lanyard pulley reels (1304), the Z-folded flexible PV blanket (204) is simultaneously extended by unfolding it until it is fully deployed, planar and under tension. In order to allow separate deployment unfolding of the flexible PV blanket (204) that is independent of the elastic roll out booms (201), the flexible PV blanket (204) is not attached to (i.e. uncoupled from) the roll out booms (201) along its two longitudinal edges.

The invention claimed is:

1. A deployable structure comprising: an elastic roll out boom comprising:
a thin-wall tubular, elongated structure, of a fiber-composite layup material having internal strain energy, the elastic roll out boom having a stowage configuration for transport and a deployed configuration in which the elastic roll out boom is fully extended, the elastic roll out boom having a first end, a second end opposite said first end, wherein a longitudinal axis is defined by the first end and the second end when the elastic roll out boom is in the deployed configuration, wherein only the internal strain energy of the fiber-composite layup material causes extension of the elastic roll out boom from the stowage configuration to the deployed configuration without passive or active heating of the fiber-composite layup material.

2. The deployable structure of claim 1 wherein the fiber-composite layup material is primarily unidirectional.

3. The deployable structure of claim 1 further comprising a mandrel, the mandrel being a substantially cylindrical structure having a longitudinal axis upon which the mandrel is able to rotate, wherein the longitudinal axis of the elastic roll out boom is perpendicular to the longitudinal axis of the mandrel, and the elastic roll out boom is capable of being reversibly flattened in cross-section and rolled upon the mandrel into the stowage configuration.

4. The deployable structure of claim 3 further comprising a yoke support structure, the yoke support structure providing a fixed base for deployment of the elastic roll out boom, wherein the first end of the elastic roll out boom is attached to the mandrel and the second end is attached to the yoke support structure.

5. The deployable structure of claim 4 further comprising a deployment control device which controls the deployment of the elastic roll out boom as the elastic roll out boom extends into the deployed configuration.

6. The deployable structure of claim 5 wherein the deployment control device comprises (i) a stabilizer arm and a boom control roller, wherein the stabilizer arm connects the boom control roller about the longitudinal axis of the mandrel, and (ii) a rotary damping mechanism, wherein the rotary damping mechanism is connected in-line with the longitudinal axis of the mandrel, wherein the rotary damping mechanism controls the rate of mandrel rotation during deployment of the elastic roll out boom as the elastic roll out boom extends into the deployed configuration.

7. The deployable structure of claim 5 wherein the deployment control device comprises (i) a stabilizer bar, a stabilizer arm, and a boom control roller, wherein the stabilizer arm connects the boom control roller to the longitudinal axis of the mandrel, and (ii) a deployment lanyard and a rotating pulley, wherein the deployment lanyard has a first end and a second end opposite said first end, wherein the first end of the deployment lanyard is attached to the stabilizer bar, wherein the second end of the deployment lanyard is attached to the rotating pulley, and wherein the rotating pulley is attached to the yoke support structure such that unidirectional boom deployment is effected.

8. The deployable structure of claim 4, further comprising a flexible photovoltaic blanket, wherein the flexible photovoltaic blanket is substantially planar having a first end and a second end, wherein the flexible photovoltaic blanket is attached at the first end to the mandrel, and at the second end to the yoke support structure.

9. The deployable structure of claim 8, wherein the elastic roll out boom and the flexible photovoltaic blanket are capable of being rolled onto the mandrel simultaneously into the stowage configuration.

10. A deployable structure comprising:
a. an elastic roll out boom comprising a thin-wall tubular, elongated structure, of a fiber-composite layup material having internal strain energy, the elastic roll out boom having a stowage configuration for transport and a deployed configuration in which the elastic roll out boom is fully extended, the elastic roll out boom having a first end, a second end opposite said first end, wherein a longitudinal axis is defined by the first end and the second end when the elastic roll out boom is in the deployed configuration, wherein only the internal strain energy of the fiber-composite layup material causes extension of the elastic roll out boom from the stowage configuration to the deployed configuration;
b. a mandrel, the mandrel being a substantially cylindrical structure having a longitudinal axis upon which the mandrel is able to rotate, wherein the longitudinal axis of the elastic roll out boom is perpendicular to the longitudinal axis of the mandrel, and the elastic roll out boom is capable of being reversibly flattened in cross-section and rolled upon the mandrel into the stowage configuration;
c. a yoke support structure, the yoke support structure providing a fixed base for deployment of the elastic roll out boom, wherein the first end of the elastic roll out boom is attached to the mandrel and the second end is attached to the yoke support structure; and
d. a flexible photovoltaic blanket, wherein the flexible photovoltaic blanket is substantially planar having a first end and a second end, wherein the flexible photovoltaic blanket is connected at the first end to the mandrel, and at the second end to the yoke support structure, wherein the flexible photovoltaic blanket deploys simultaneously with the elastic roll out boom from the stowage configuration to the deployed configuration.

11. The deployable structure of claim 10 wherein the flexible photovoltaic blanket is not attached to the elastic roll out boom.

12. The deployable structure of claim 10 wherein the fiber-composite layup material is primarily unidirectional.

13. The deployable structure of claim 10 further comprising a deployment control device which controls the deployment of the elastic roll out boom as the elastic roll out boom extends into the deployed configuration.

14. The deployable structure of claim 13 wherein the deployment control device comprises: (i) a stabilizer arm and a boom control roller, wherein the stabilizer arm connects the boom control roller about the longitudinal axis of the mandrel, and (ii) a rotary damping mechanism, wherein the rotary damping mechanism is connected in-line with the longitudinal axis of the mandrel, wherein the rotary damping mechanism controls the rate of mandrel rotation during deployment of the elastic roll out boom as the elastic roll out boom extends into the deployed configuration.

15. The deployable structure of claim 13 wherein the deployment control device comprises: (i) a stabilizer bar, a stabilizer arm and a boom control roller, wherein the stabilizer arm connects the boom control roller to the longitudinal axis of the mandrel, and (ii) a deployment lanyard and a rotating pulley, wherein the deployment lanyard has a first end and a second end opposite said first end, wherein the first end of the deployment lanyard is attached to the stabilizer bar and the second end of the deployment lanyard is attached to the rotating pulley, and the rotating pulley is attached to the yoke support structure.

16. The deployable structure of claim 13 wherein the flexible photovoltaic blanket has a stowage configuration as a stowed roll having a diameter, wherein the deployment control device comprises (i) a stabilizer bar, a stabilizer arm and a boom control roller, wherein the stabilizer arm connects the boom control roller to the longitudinal axis of the mandrel, (ii) a frictionless tensioned containment strap, and a strap cross bar, wherein the frictionless tensioned containment strap has a first end and a second end, the first end connected to the stabilizer bar, the second end being connected to the strap cross bar, wherein the frictionless tensioned containment strap surrounds the stowed roll, (iii) wherein the frictionless tensioned containment strap controls the stowed roll diameter during deployment to the deployed configuration.

17. The deployable structure of claim 10, further comprising a lateral blanket support structure, a base preload platen, and a tip preload platen, wherein the lateral blanket support structure is attached to the mandrel wherein the flexible photovoltaic blanket is attached at the first end to the lateral blanket support structure, and at the second end to the yoke support structure, wherein the flexible photovoltaic blanket is stowable in the stowage configuration between the tip preload platen and the base preload platen as a z-fold flat package.

18. The deployable structure of claim 17, further comprising a lateral blanket mandrel system comprising a system of lanyards and pulleys, and an auxiliary electric motor, wherein the flexible photovoltaic blanket is attached at the first end to the lateral blanket support structure and at the second end to the yoke support structure, wherein the lateral blanket mandrel system powers extension of the flexible photovoltaic blanket to the deployed configuration.

* * * * *